(12) United States Patent
Karpinski

(10) Patent No.: US 6,512,365 B1
(45) Date of Patent: Jan. 28, 2003

(54) SENSOR FOR MONITORING ANGULAR VELOCITY

(75) Inventor: John L. Karpinski, Massillon, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 09/902,295

(22) Filed: Jul. 10, 2001

(51) Int. Cl.[7] .................................................. G01P 3/48
(52) U.S. Cl. .................... 324/173; 324/207.25; 384/448
(58) Field of Search ......................... 384/448; 324/173, 324/174, 207.11–207.26

(56) References Cited

U.S. PATENT DOCUMENTS

| | | | |
|---|---|---|---|
| 5,085,519 A | 2/1992 | Dougherty | 384/448 |
| 5,123,755 A | 6/1992 | Faye et al. | 384/448 |
| 5,486,758 A | * 1/1996 | Hammerle | 324/174 |

FOREIGN PATENT DOCUMENTS

WO          WO9858762          12/1998

OTHER PUBLICATIONS

Abstraction Control, David A. Foster, Developments in Wheel Speed Sensing, Feb., 1988, pp. 39–45.

* cited by examiner

Primary Examiner—Edward Lefkowitz
Assistant Examiner—Reena Aurora
(74) Attorney, Agent, or Firm—Polster, Lieder, Woodruff, & Lucchesi, L.C.

(57) ABSTRACT

A hub assembly for coupling a road wheel of an automotive vehicle to the suspension system of the vehicle includes a housing and a hub having a spindle which extends into the housing where it rotates on a bearing having rolling elements arranged in two rows. The spindle carries a target wheel between the two rows of rolling elements, and the housing has a hole which opens into the space between the two rows. Here the housing is fitted with a sensor that monitors the rotation of the target wheel. The sensor has a bushing which is within the hole and a probe which extends from the bushing into the housing where it has a pickup area that is presented toward the target wheel. The bushing is positioned within the hole by an O-ring that is compressed between it and the surface of the hole. The bushing also has a leading surface that leads up to the O-ring and has a diameter only slightly less than the diameter of the hole. It also has a trailing surface of lesser diameter on the other side of the O-ring. The leading surface prevents the probe from deviating from its desired position and facilitates installation of the sensor in the housing.

19 Claims, 3 Drawing Sheets

SENSOR FOR MONITORING ANGULAR VELOCITY

BACKGROUND OF THE INVENTION

This invention relates in general to sensing devices and, more particularly, to a sensor for monitoring angular velocity.

Many automotive vehicles of current manufacture come equipped with antilock braking systems and some with traction control systems as well. In a vehicle so equipped, the systems monitor the rotation of some, if not all, of the wheels—and certainly the front wheels which steer the vehicle. Should a wheel begin to slip when the brakes are applied, as could well occur if the wheel encounters snow or ice, the antilock braking system will detect the loss of velocity and relax the braking force on that wheel. This allows the wheel to continue to rotate and enables the driver to maintain better control over the vehicle. On the other hand, if one of the driving wheels encounters slippery pavement and as a consequence loses traction, the traction control system will apply a braking force to that wheel, and this has the effect of transferring the torque to the opposite wheel which perhaps has better traction.

An antilock braking system or a traction control system for a vehicle thus requires speed sensors to monitor the rotation of some, if not all, of the wheels on the vehicle, and while a variety of locations exist on a vehicle for installation of a speed sensor for a wheel, perhaps the best is in the housing that contains the bearing on which the wheel—or more accurately, the hub for the wheel—rotates. This keeps much of the sensor isolated from contaminants and objects that might otherwise damage it or disrupt its operation. In this regard, the typical sensor of this type fits into a cylindrical hole in the housing and has a stationary probe which is presented toward a target wheel that rotates with the road wheel and contains discontinuities, such as teeth, which the sensor detects as the target wheel revolves. The result is a pulsating signal which reflects the angular velocity of the wheel. A control system monitors the signals from the wheels and initiates braking to achieve the results desired. The spacing between a probe and its target wheel has a significant affect on the operation of the sensor, and it should not vary significantly from the optimum. But many sensors of current manufacture that are installed in housing holes leave much to be desired in this regard.

More specifically, the diameter of the through hole that receives the typical sensor exceeds the diameter of the sensor by a good measure, an as a consequence the sensor is not confined to a fixed radial position in the hole. To be sure, the sensor is fitted with an elastomeric O-ring, which establishes a seal between the sensor and the wall of the hole and further serves to center the sensor in the hole. But as a centering device the O-ring provides little precision and further will enable the sensor to drift laterally from the position it initially assumes. With many active—as opposed to passive—sensor, the target wheel revolves opposite a laterally presented face on the probe of the sensor, and the size of the gap between the side face of the probe and the target wheel is critical. It should remain constant and at an optimum setting.

Aside from that, when a sensor is inserted off center into its hole, a very real danger exists that the O-ring will be damaged during the insertion. This may compromise the fluid barrier that the O-ring normally provides and further can displace the sensor from the center of the hole.

SUMMARY OF THE INVENTION

A sensor for installation in a hole in a housing to monitor the rotation of a target wheel in the housing has a bushing and a probe extended from the bushing into the housing where it has a pickup area. An annular elastomeric element encircles the bushing to position the bushing in the hole and a leading surface on the bushing leads up to the elastomeric element to center the bushing in a hole into which it is fitted. The invention also resides in the sensor installed in the housing where the pickup area on its probe is presented toward the target wheel. The housing may contain a bearing, in which event the target wheel rotates with a hub spindle that extends into the housing.

DETAILED DESCRIPTION OF THE INVENTION

Figure 1:
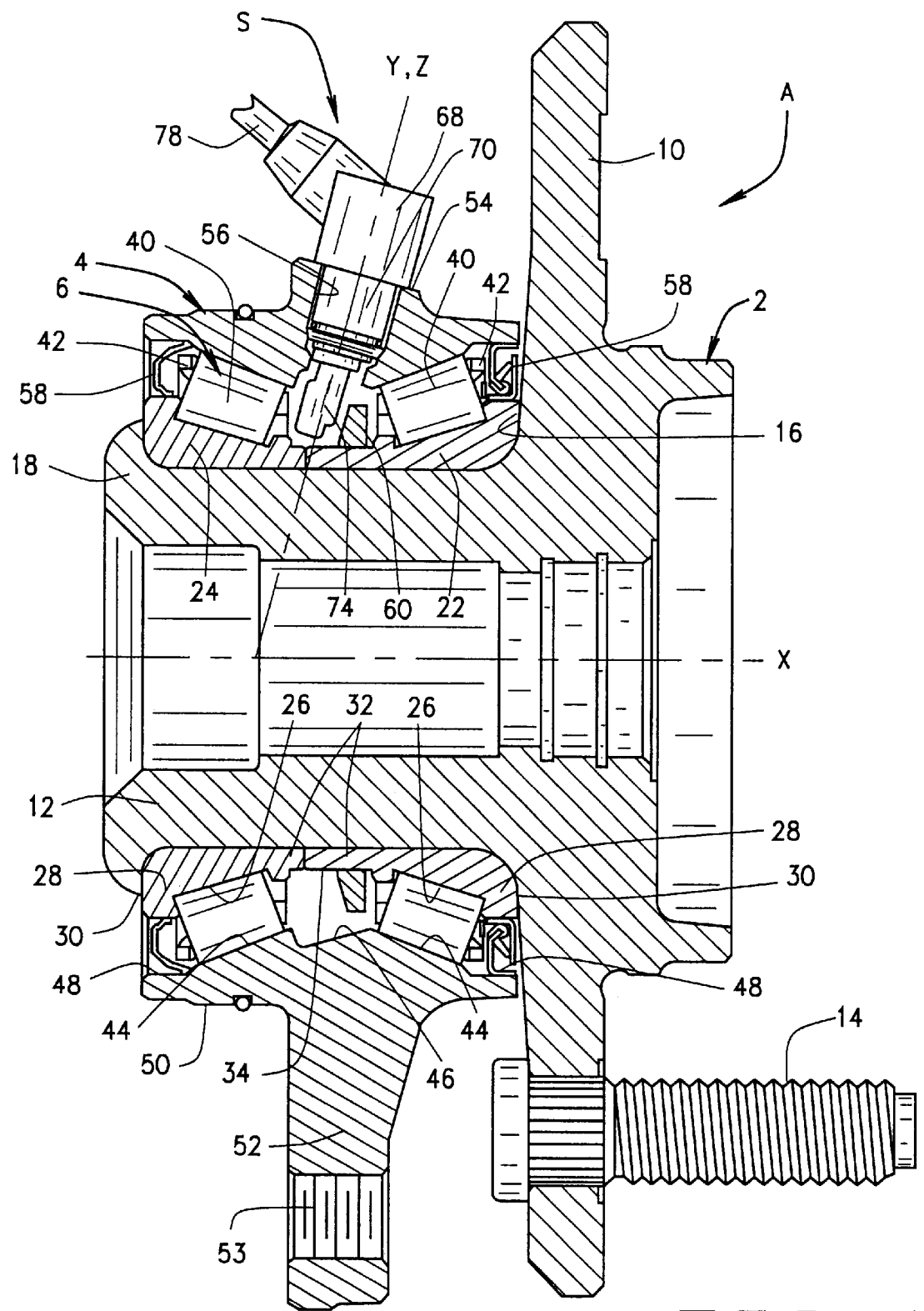
FIG. 1 is a longitudinal sectional view of a hub assembly provided with an active sensor constructed in accordance with and embodying the present invention.

Referring now to the drawings, a hub assembly A (FIG. 1), which mounts a road wheel (not shown) for a vehicle on the suspension system of the vehicle, contains a sensor S which produces an electrical signal that reflects the angular velocity of the wheel. The sensor S forms part of an antilock brake system or a traction control system or both, and the signal it produces is analyzed by a controller which controls a braking force or action applied to the wheel. The hub assembly A includes a hub 2, a housing 4 that is generally located around the hub 2, and a bearing 6 which enables the hub 2 to rotate relative to the housing 4 about an axis X of rotation with relatively little friction. The road wheel and a brake rotor (not shown) are attached to the hub 2, while the housing 4 is secured firmly against a component of the vehicle suspension system, such as a steering knuckle (not shown). Here the hub 2 may be coupled to a CV joint (not shown) that delivers torque to the hub 2 and the wheel.

The hub 2 has (FIG. 1) flange 10 and a spindle 12 which are joined together as an integral steel forging or casting, with the spindle 12 projecting from one face of the flange 10. Radially beyond the spindle 12 the flange 10 contains wheel studs 14 which project axially from its other face. Lug nuts (not shown) thread over the wheel studs 14 to fasten the brake rotor and road wheel to the hub 2. The spindle 12 emerges from a shoulder 16 located along the inside face of the flange 10, and provides a seat for the bearing 6. At its opposite end the spindle 12 has an abutment which retains the bearing 6 on the spindle, and that abutment may be a formed end 18 which is directed outwardly as an integral part of the spindle 12. International application PCT/GB 98/01823, filed Jun. 22, 1998 and published Dec. 30, 1998 under International Publication No. WO 98/58762, discloses a rotary forming process for creating the formed end 18. The abutment at the end of the spindle 12 may also take the form of a nut threaded over the spindle 12 or a snap ring engaged with the spindle 12.

The bearing 6 includes (FIG. 1) two inner races in the form of an outboard cone 22 and an inboard cone 24 which fit around the spindle 12 with interference fits and are captured between the shoulder 16 and the formed end 18. Each cone 22 and 24 has a tapered raceway 26 that is presented outwardly away from the axis X and a thrust rib 28 located at the large end of its raceway 26 and providing a back face 30 which is squared off with respect to the axis X. At their opposite ends beyond the small diameter ends of their raceways 26, the two cones 22 and 24 have axially directed extensions 32. Indeed, the two cones 22 and 24 abut at the ends of their extensions 32. On the other hand, the back face 28 of the outboard cone 22 abuts the shoulder 16 on the flange 10, while the back face 28 of the inboard cone 24 abuts the formed end 18. Thus, the two cones 22 and 24 are captured between the shoulder 16 and the formed end 18. The extension 32 for the outboard cone 22 is longer than the extension 32 for the inboard cone 24 and provides a cylindrical seat 34 which leads out to the end of the extension 32.

In addition to the cones 22 and 24, the bearing 6 includes (FIG. 1) tapered rollers 40 arranged in two rows, there being a separate row around each cone 22 and 24. Actually, the rollers 40 extend around the raceways 26 for the cones 22 and 24, with their tapered side faces being along the raceways 26 and their large end faces against the thrust ribs 28. The rollers 40 of each row are essentially on apex, which means that the envelopes in which their tapered side faces lie have their apices located at a common point along the axis X. Each row of rollers 40 has a cage 42 to maintain the proper spacing between the rollers 40 in that row.

The ring-like housing 4 surrounds the spindle 12 as well as the two cones 22 and 24 and the two rows of rollers 40 (FIG. 1). It forms part of the bearing 6 in that it has tapered raceways 44 which are presented inwardly toward the axis X. In that sense, the housing 4 constitutes the outer race of the bearing 6. The raceways 44 on the housing 4 taper downwardly toward an intervening surface 46 which separates them and encircles the extensions 32 on the two cones 22 and 24. Actually, the intervening surface 46 lies oblique to the axis X, it being inclined generally in the same direction as the inboard raceway 44. The rollers 40 likewise lie along the raceways 44 of the housing 4, contacting the raceways 44 at their tapered side faces. At their large ends, the raceways 44 open into short counterbores 48 in which the thrust ribs 28 of the two cones 22 and 24 are located.

The housing 4 (FIG. 1) has a generally cylindrical exterior surface 50 and a triangular or rectangular flange 52 which projects radially from the surface 50 and generally surrounds the intervening surface 46 that is within the interior of the housing 4. Along its flange 52, the housing 4 is secured firmly to the suspension system component with bolts that engage threaded holes 53 in the lobes of the flange 52 or at least pass through the lobes. Between its lobes the flange 52 lies quite close to the cylindrical exterior surface 50 and between two of the lobes the flange 52 has a beveled surface 54 (FIG. 2) which lies generally parallel to the intervening surface 46 between the two raceways 44. Here the housing 4 is provided with an inclined hole 56 which extends from the beveled surface 54 inwardly to the intervening surface 46 and opens out of both.

The hole 56, which is cylindrical, has an axis Y (FIGS. 1 and 2) that is perpendicular to the surfaces 46 and 54 and intersects the axis X at an angle that may range between 84° and 86° and preferably is 85°. The hole 56 may be reamed to provide it with a smooth cylindrical surface.

The counterbores 48 in the housing 4 contain (FIG. 1) seals 58 which establish dynamic fluid barriers at the ends of the housing 4. These barriers isolate the rollers 40 and the raceways 26 and 44 from road contaminants, such as water, ice-melting sales and dirt.

Figure 2:
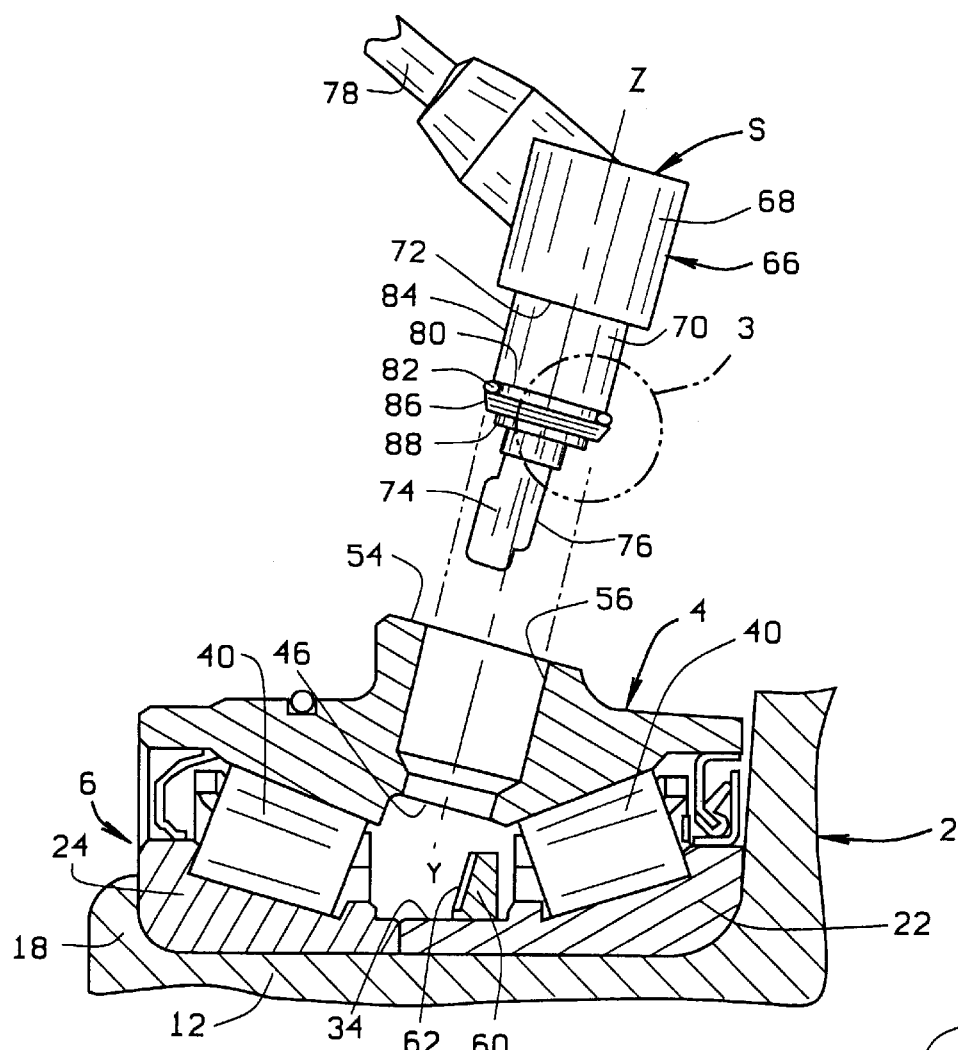
FIG. 2 is an exploded view of the hub assembly and sensor, with the former being in section.

The inclined hole 56 in the housing 4 receives the speed sensor S which monitors a target wheel 60 that is carried by the outboard cone 22 and thus rotates with the cone 22 and the hub 2 (FIGS. 1 and 2). The target wheel 60 is pressed over the extension 32 on the cone 22 to a position offset from the axis Y of the hole 56, there being an interference fit between the wheel 60 and the cylindrical seat 34 on the extension 32. The target wheel 60 has discontinuities which take the form of teeth 62 which are presented toward the rollers 40 of the inboard row, and are likewise offset from axis Y.

The sensor S includes (FIG. 2) a body 66 having a head 68 and a smaller bushing 70 which projects from a shoulder 72 on the head 68. The bushing 70 is generally cylindrical and establishes an axis Z which should coincide with the axis Y of the hole 56 when the bushing 70 is in the hole 56. In addition, the sensor S has a probe 74 which projects from the bushing 70 into the interior of the housing 4. The probe 74 has a pickup area 76 that is presented laterally away from the axis Z and toward the teeth 62 of the target wheel 60. Here the sensor S generates an electrical signal which is transmitted to a controller on the vehicle through a wire 78 that leads from the head 68.

Figure 3:
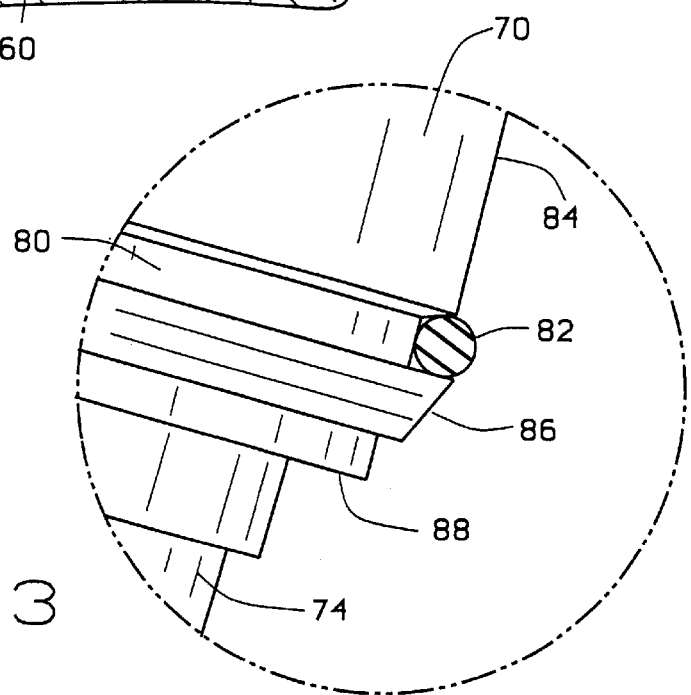
FIG. 3 is an enlarged fragmentary view of the region of the sensor enclosed within the dotted circle 3 of FIG. 2.

Considering the bushing 70 in more detail, it contains (FIGS. 2 and 3) an annular groove 80 which opens radially out of it and receives an elastomeric O-ring 82. Between the groove 80 and the shoulder 72 of the head 68 is a trailing surface 84 of cylindrical configuration. On the other side of the groove 80 is a tapered leading surface 86 that possesses its greatest diameter at the groove 80 and tapers inwardly from there. Beyond the tapered surface 86, the bushing 70 has a stepped end 88 from which the probe 74 projects. The diameter of the hole 56 into which the bushing 70 fits exceeds the diameter of the trailing surface 84 on the bushing 70 by between 0.006 and 0.014 in. and preferably by about 0.007 in. On the other hand, the diameter of the hole 56 exceeds the greatest diameter of the tapered surface 86 by between 0.001 and 0.009 in. and preferably by about 0.002 in. Thus, the differences in diameter between the diameter of the leading surface 86 and the diameter of the trailing surface 84 may range between 0.004 in. and 0.006 in. The smallest diameter on the tapered surface 86 is no greater than the diameter of the trailing surface 84. The tapered surface 86 lies oblique to the axis Z. The O-ring 82 when fitted into the annular groove 80 bears against the base of the groove 80 and when otherwise undistorted has an outside diameter exceeding the diameter of the hole 56 by about 0.015 to 0.025 in. and preferably by about 0.020 in. The stepped end 88 lies inwardly from the smallest diameter on the tapered surface 86.

To assemble the hub assembly A, the target wheel 60 is pressed over the extension 32 of the outboard-cone 22 before the cone 22 is installed in the housing 4, although not to its final position. Then the outboard cone 22 with its complement of rollers 40 is inserted with the housing 4 such that the rollers 40 of the outboard row seat against the raceway 26 of the outboard cone 22 and against the outboard raceway 44 of the housing 4. At this juncture, the target wheel 60 is pressed still farther over the extension 32 of the outboard cone 22 until a prescribed spacing exists between its teeth 96 and the axis Y of the inclined hole 56 in the housing 4. Thereupon, the inboard cone 24, with its complement of rollers 40, is inserted into the housing 4. Thereafter, the two cones 22 and 24 are passed over the spindle 12 of the hub 2 with the housing 4 captured between the two rows of rollers 40 on the cones 22 and 24. Thereupon, the end of the spindle 12 is upset to produce the formed end 18. The extensions 32 on the two cones 22 and 24 abut, and their lengths are such that a slight preload exists in the bearing 6.

Once the hub 2, housing 4 and bearing 6 are all assembled and united, the sensor S is installed in the housing 4. To this end the probe 74 of the sensor S is aligned with the inclined hole 56 in the housing 4 and advanced to the hole 56. After a short distance, the beveled surface 86 at the distal end of the bushing 70 encounters the outer edge of the hole 56, and as the advance continues, the beveled surface 86 deflects the probe 74 toward a centered position in the hole 56—a position in which the axes Y and Z of the hole 56 and sensor body 66, respectively, are quite close, if not aligned. This brings the O-ring 82 into a generally centered position with respect to the hole 56, and with continued advancement of the bushing 70, the O-ring 82 contracts radially and enters the hole 56. Since the O-ring 82 is centered with respect to the hole 56 when it enters the hole 56, it deforms uniformly around its periphery and is less likely to be damaged than if it were off center. The advancement continues with the O-ring 82 sliding along the surface of the hole 56 until the shoulder 72 on the head 68 comes against beveled surface 54 on the flange 52 of the housing 4. The O-ring 82 establishes a fluid barrier between the surface of the hole 56 and the bushing 70 and prevents contaminants such as water, ice-melting chemicals and dust and dirt from entering the interior of the housing 4.

While the O-ring 82 determines the radial position of the bushing 70 in the hole 56, that radial position cannot deviate more than one-half the difference between the diameter of the hole 56 and the maximum diameter of the tapered surface 86 on the bushing 70. This is significantly less than one-half the difference between the diameter of the hole 56 and the diameter of the trailing surface 84, which is the latitude available with conventional arrangements. Since the tapered surface 86 limits the deviation between the axis Y of the hole 56 and the axis Z of the bushing 70, the position of the pickup area 76 on the probe 74 relative to the target wheel 60 falls within much closer tolerances. Basically, the pickup area 76 of the probe 74 will not deviate from its ideal position more then one-half the distance between the diameter of the hole 56 and the maximum diameter of the tapered surface 86. With an active sensor, as is the sensor S, the distance between the pick up area 76 on the probe 74 and the teeth 62 of the target wheel 60 is important and must remain within prescribed tolerances for the sensor S to operate effectively.

Aside from protecting the O-ring 82 during the installation of the sensor S and reducing the maximum deviation of the probe 74 from an ideal position, the tapered surface 86 on the bushing 70 enables the O-ring 82 to provide a more reliable seal between the bushing 70 and the surface of the hole 56. It further facilitates installation of the bushing 70 into the hole 56.

During the operation of the bearing assembly A, the hub 2 rotates with the road wheel. Since the two cones 22 and 24 are pressed over the spindle 12 of the hub 2, they also rotate as does the target wheel 60 which is pressed over the extension 32 of the outboard cone 22. As the teeth 62 of the target wheel 60 move past the pickup area 76 on the probe 74, they disrupt a magnetic field and cause the sensor S to produce a pulsating electrical signal, the frequency of which reflects the angular velocity of the hub 2.

Figures 4, 5:
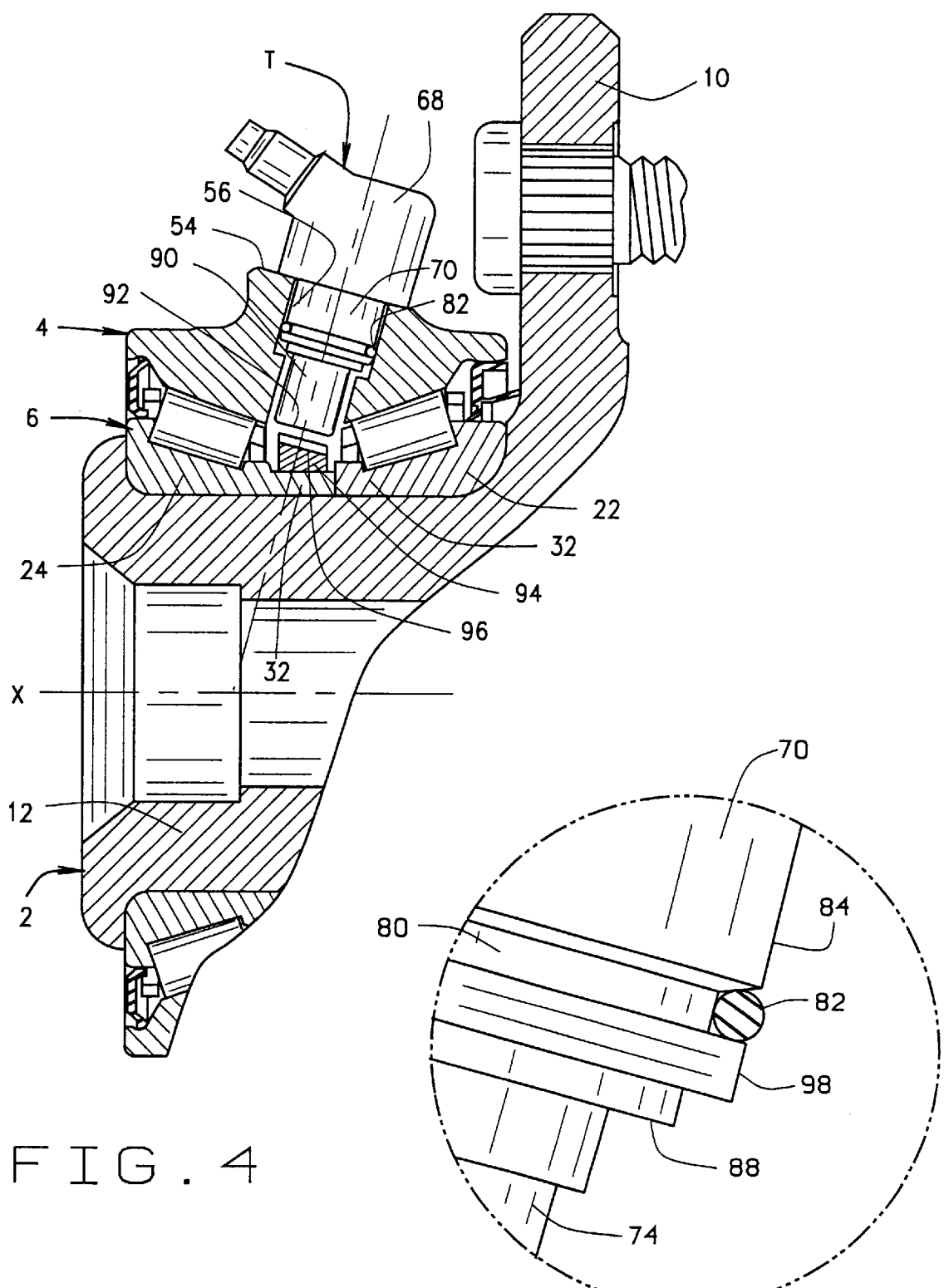
FIG. 4 is a longitudinal sectional view of a hub assembly with a passive sensor constructed in accordance with and embodying the present invention.
FIG. 5 is an enlarged fragmentary view of the sensor, similar to FIG. 3, but illustrating a modified bushing.

A modified sensor T (FIG. 4) resembles the sensor S in that its body 66 externally does not differ from the body 66 of the sensor S, although it has a probe 90, which renders the sensor T more suitable as the passive variety than as the active variety. The probe 90 has a pickup area 92 at its end where it is presented toward the axis X, actually at an angle which corresponds to the angle of the beveled surface 54. The pickup area 92 of the probe 90 lies opposite a modified target wheel 94 having teeth 96 that are preferably inclined at the angle of the pickup area 92. The target wheel 94 is pressed over the extension 32 on the inboard cone 24 which, to accommodate the target wheel 94, is longer then the extension 32 on the outboard cone 22.

In lieu of a tapered leading surface 86, on its bushing 70, either one of the sensors S and T may have a cylindrical leading surface 98 (FIG. 5), the diameter of which is between 0.001 and 0.009 in. and preferably 0.002 in. less than the diameter of the hole 56. Other than that, the bushing 70 with the cylindrical surface 98 and the bushing 70 with the tapered surface 86 are the same and are used with the same O-ring 82 and in the same hole 56.

The raceways 44 of the housing 4 may be on separate outer races or cups that are in the housing 4 or on a single race or double cup in the housing 4. Moreover, the outboard cone 22 may be formed as an integral part of the spindle 12. Apart from that, the cones 22 and 24 may be retained on the spindle 12 by means other than the formed end 18—for example, a nut threaded over the spindle 12 or a snap ring fitted to it. Also the discontinuities in the target wheels 60 and 94 may take forms other than the teeth 62 and 96. For example, they may be alternate north and south poles along the wheels 60 and 94.

The sensors S and T and their respective target wheels 60 and 94 have utility beyond hub assemblies and antilock braking systems or traction control systems. Indeed, the sensors S and T may be used in any housing that contains a hole, similar to the hole 56, which opens toward a rotating member that carries a target wheel.

What is claimed is:

1. In combination with a housing that contains a hole having a generally cylindrical wall and with a target wheel that rotates within the housing and has discontinuities, a sensor which detects movement of discontinuities on the target wheel as a consequence of rotation of the target wheel and produces a signal which reflects the angular velocity of the target wheel, the sensor comprising; a bushing located within the hole and having a leading surface and trailing surface, both of which are presented toward the surface of the hole, with clearances between the leading and trailing surfaces and the surface of the hole, the leading surface having a diameter greater than the trailing surface and being closer to the target wheel than the trailing surface, the bushing also having a groove located between the leading and trailing surfaces where it opens toward the surface of the hole; an annular elastomeric element contained within the groove of the bushing between the leading and trailing surfaces and being compressed between the bushing and the surface of the hole; and a probe extended from the bushing beyond the leading surface and into the interior of the housing, the probe having a pickup area that is presented toward the target wheel.

2. The combination according to claim 1 wherein the sensor further has a head beyond the trailing surface of the bushing, with the head being larger than the hole and providing a shoulder which is presented toward the housing.

3. The combination according to claim 1 wherein the leading surface is tapered and has its greatest diameter toward the groove.

4. The combination according to claim 3 wherein the smallest diameter of the tapered surface on the bushing does not exceed the diameter of the trailing surface.

5. The combination according to claim 4 wherein the smallest diameter of the tapered surface is substantially equal to the diameter of the trailing surface.

6. The combination according to claim 1 wherein the leading surface is cylindrical.

7. The combination according to claim 1 wherein the diameter of the hole exceeds the greatest diameter of the leading surface by between about 0.001 and about 0.004 inches.

8. The combination according to claim 1 wherein the pickup area is on the side of the probe.

9. The combination according to claim 8 wherein the axis of the hole is oblique to the axis of rotation for the target wheel.

10. A sensor comprising: a bushing having an axis and inner and outer ends along the axis and also an annular groove located between the ends and opening away from the axis, the bushing further having a generally cylindrical trailing surface between the groove and the outer end and a circular leading surface between the groove and the inner end, with the leading surface having a diameter exceeding the diameter of the trailing surface; an annular seal element located in the groove, the seal element being formed from an elastomer and, when undistorted, having a diameter greater than the diameter of the leading surface; and a probe extended from the inner end of the bushing and being capable of detecting rotation of a target wheel having discontinuities in it.

11. A sensor according to claim 10 wherein the diameter of the leading surface exceeds the diameter of the trailing surface by between about 0.004 in. and about 0.006 in.

12. A sensor according to claim 10 and further comprising a head at the outer end of the bushing, the head being larger than the bushing.

13. A sensor according to claim 10 wherein the leading surface is tapered and the smallest diameter of the tapered leading surface does not exceed the diameter of the cylindrical trailing surface.

14. In combination with a hub that is located around an axis of rotation and has a flange and a spindle projecting from the flange, a first inner raceway carried by the spindle adjacent to the flange and oriented oblique to the axis, a second inner raceway carried by the spindle and also oriented oblique to the axis, but being inclined in the direction opposite to the inclination of the first inner raceway, the second inner raceway being spaced axially from the first inner raceway; a housing located around the spindle of the hub; a first outer raceway carried by the housing and presented toward the first inner raceway, the first outer raceway being oblique to the axis and inclined in the same direction as the first inner raceway; a second outer raceway carried by the housing and presented toward the second inner raceway, the second outer raceway being oblique to the axis and inclined in the same direction as the second inner raceway, the second outer raceway further being spaced axially from the first outer raceway so that an intervening surface exists between the first and second outer raceways; first rolling elements arranged in a row between the first inner and outer raceways; and second rolling elements arranged in a row between the second inner and outer raceways; the improvement comprising: a hole extended through the housing and opening into the housing through the intervening surface; the hole having a substantially cylindrical surface; a target wheel carried by the spindle between the first and second inner raceways and having discontinuities along it, whereby the target wheel will rotate when the hub rotates; and a sensor carried by the housing for monitoring the rotation of hub, said sensor comprising a bushing located within the hole, an annular elastomeric element compressed between the bushing and the cylindrical surface of the hole, and a probe extended from the bushing into the interior of the housing, the bushing having leading and trailing surfaces that are within the hole with clearances between the leading and trailing surfaces and the surface of the bore, the leading surface being ahead of the elastomeric element and the trailing surface being behind the elastomeric element, the leading surface having a diameter greater than the diameter of the trailing surface, the probe having a pickup area that is presented toward the discontinuities on the target wheel.

15. The combination according to claim 14 wherein the diameter of the hole in the housing exceeds the diameter of the leading surface on the bushing of the sensor by between about 0.001 in. and about 0.009 in.

16. The combination according to claim 14 wherein the discontinuities on the target wheel are presented generally toward one of the rows of rolling elements and the probe of the sensor extends into the space between that row of rolling elements and the target wheel.

17. The combination according to claim 14 wherein the sensor also includes a head which is larger than the hole and lies outside the housing and from which bushing extends.

18. The combination according to claim 14 wherein the bushing of the sensor contains an annular groove that is located between the leading and trailing surfaces and opens toward the surface of the hole; and wherein the elastomeric element is in the groove.

19. The combination according to claim 18 wherein the leading surface on the bushing is tapered and has its greatest diameter at the groove.

* * * * *